United States Patent
Wang et al.

(10) Patent No.: US 11,578,430 B2
(45) Date of Patent: Feb. 14, 2023

(54) MELT BLOWN WEB WITH GOOD WATER BARRIER PROPERTIES

(71) Applicant: BOREALIS AG, Vienna (AT)

(72) Inventors: Jingbo Wang, Engerwitzdorf (AT); Joachim Fiebig, Engerwitzdorf (AT); Henk Van Paridon, Averbode (BE); Markus Gahleitner, Neuhofen/Krems (AT); Petar Doshev, Linz (AT); Georg Grestenberger, St. Peter in der Au (AT); Antti Tynys, Linz (AT)

(73) Assignee: Borealis AG, Vienna (AT)

(*) Notice: Subject to any disclaimer, the term of this patent is extended or adjusted under 35 U.S.C. 154(b) by 114 days.

(21) Appl. No.: 16/303,845

(22) PCT Filed: Jun. 2, 2017

(86) PCT No.: PCT/EP2017/063486
§ 371 (c)(1),
(2) Date: Nov. 21, 2018

(87) PCT Pub. No.: WO2017/211721
PCT Pub. Date: Dec. 14, 2017

(65) Prior Publication Data
US 2019/0301055 A1    Oct. 3, 2019

(30) Foreign Application Priority Data
Jun. 6, 2016  (EP) .................................. 16173182

(51) Int. Cl.
| | |
|---|---|
| *D01F 6/46* | (2006.01) |
| *C08L 23/12* | (2006.01) |
| *D04H 1/544* | (2012.01) |
| *D01D 5/098* | (2006.01) |
| *D01F 6/06* | (2006.01) |
| *D04H 1/4291* | (2012.01) |
| *D04H 1/56* | (2006.01) |
| *D04H 3/007* | (2012.01) |
| *D04H 3/16* | (2006.01) |

(52) U.S. Cl.
CPC ............... *D01F 6/46* (2013.01); *C08L 23/12* (2013.01); *D01D 5/0985* (2013.01); *D01F 6/06* (2013.01); *D04H 1/4291* (2013.01); *D04H 1/544* (2013.01); *D04H 1/56* (2013.01); *D04H 3/007* (2013.01); *D04H 3/16* (2013.01); *C08L 2203/12* (2013.01); *C08L 2205/025* (2013.01); *D10B 2501/04* (2013.01); *D10B 2505/04* (2013.01); *D10B 2509/026* (2013.01)

(58) Field of Classification Search
None
See application file for complete search history.

(56) References Cited

U.S. PATENT DOCUMENTS

| | | | |
|---|---|---|---|
| 2009/0017710 A1 | 1/2009 | Bugada et al. | |
| 2009/0053959 A1* | 2/2009 | Datta ...................... | B32B 5/022 442/328 |

FOREIGN PATENT DOCUMENTS

| | | | |
|---|---|---|---|
| EP | 2974778 | | 1/2016 |
| WO | WO2015082379 | | 6/2015 |
| WO | WO2016036466 | * | 3/2016 |

OTHER PUBLICATIONS

Singh, et al., "Triad Sequence Determination of Ethylene-Propylene Copolymers—Application of Quantitative 13C NMR, Polymer Testing," vol. 29, 2009, pp. 475-479.
Zhou, et al., "A new decoupling method for accurate quantification of polyethylene copolymer composition and triad sequence distribution with 13C NMR," Journal of Magnetic Resonance, vol. 187, 2007, pp. 225-233.
Busico, et al., "Alk-1-ene Polymerization in the Presence of a Monocyclopentadienyl Zirconium (IV) Acetamidinate Catalyst: Microstructural and Mechanistic Insights," Macromolecular Rapid Commun., vol. 28, 2007, pp. 1128-1134.
Resconi, et al., "Selectivity in Propene Polymerization with Metallocene Catalysts," Chem. Rev., vol. 100, 2000, pp. 1253-1345.
Cheng, H.N., "C NMR Analysis of Ethylene-Propylene Rubbers," Macromolecules, vol. 17, 1984, pp. 1950-1955.
Wang, et al., "Structural Analysis of Ethylene/Propylene Copolymers Synthesized with a Constrained Geometry Catalyst," Macromolecules, vol. 33, 2000, pp. 1157-1162, American Chemical Society.
International Search Report and Written Opinion for PCT/EP2017/063486 dated Jul. 3, 2017, 13 pages.
Kakugo, et al., "13C NMR Determination of Monomer Sequence Distribution in Ethylene-Propylene Copolymers Prepared with σ—TiCl3—Al (C2H5)2C1," Macromolecules, vol. 15, 1982, pp. 1150-1152.
Zweifel, H., et al., "Solubility of Additives in Polymers," Plastics Additives Handbook, 6th Edition, 2009, pp. 1141-1190, Hanser Publishers, Munich.
Brandrup, et al., "Physical Properties of Monomers", Section III, Polymer Handbook, Fourth Edition, 61 pages.

* cited by examiner

*Primary Examiner* — Shawn Mckinnon
(74) *Attorney, Agent, or Firm* — Lowenstein Sandler LLP

(57) ABSTRACT

Melt-blown fiber comprising two polypropylenes which differ in their molecular weight.

16 Claims, No Drawings

MELT BLOWN WEB WITH GOOD WATER BARRIER PROPERTIES

CROSS-REFERENCE TO RELATED APPLICATIONS

This application is a national phase entry under 35 U.S.C. § 371 of International Application No. PCT/EP2017/063486, filed on Jun. 2, 2017, which claims the benefit of priority of European Patent Application No. 16173182.3, filed on Jun. 6, 2016. The contents of these applications are hereby incorporated by reference herein in their entirety.

The present invention is directed to a melt blown fiber comprising a polypropylene composition; said composition comprises two polypropylenes which differ in the melt flow rate $MFR_2$. The invention is further directed to a melt-blown web comprising said fiber.

The non-woven polypropylene webs are widely used as barrier layers in the hygiene field and filtration media industry. One of the main requirements of the barrier layers is the barrier property, measured as the hydrohead of the web. A high hydrohead is welcome, meaning better barrier properties at similar web weight, or reduced web weight but similar barrier properties can be achieved. This means in turn reduced consumption of materials thereby reducing costs and $CO_2$ footprint. Further the air permeability should be rather low.

Thus the object of the present invention is to provide a material which is suitable for producing a melt blown web with high hydrohead and low air permeability.

The finding of the present invention is to provide a melt blown fiber based a polypropylene composition which comprises two polypropylenes which differ in their molecular weight and thus also in the melt flow rate.

Accordingly in a first aspect the present invention is directed to a melt blown fiber (MBF) comprising a polypropylene composition (PC) comprising (a) a first polypropylene (PP1) having a weight molecular weight Mw of at most 45 kg/mol, and
(b) a second polypropylene (PP2), wherein further the mixture (M) consisting of the first polypropylene (PP1) and the second polypropylene (PP2) has a melt flow rate $MFR_2$ (230° C.) measured according to ISO 1133 in the range of more than 400 to 3,500 g/10 min.

Additionally to the previous paragraph it is preferred that the first polypropylene (PP1) has a weight molecular weight Mw in the range of 10 to 45 kg/mol and/or the mixture (M) has a weight molecular weight Mw in the range of 50 to 110 kg/mol.

In a second aspect, the present invention is directed to a melt blown fiber (MBF) comprising a polypropylene composition (PC) comprising (c) a first polypropylene (PP1) having a weight molecular weight Mw of at most 45 kg/mol, and
(d) a second polypropylene (PP2), wherein further the mixture (M) consisting of the first polypropylene (PP1) and the second polypropylene (PP2) has a weight molecular weight Mw in the range of 50 to 110 kg/mol.

Additionally to the previous paragraph it is preferred that the mixture (M) has a melt flow rate $MFR_2$ (230° C.) measured according to ISO 1133 in the range of more than 400 to 3,500 g/10 min.

The following preferred embodiments apply for the first and second aspect of the present invention.

Preferably the polypropylene composition (PC) has a weight molecular weight Mw in the range of 50 to 110 kg/mol and/or a melt flow rate $MFR_2$ (230° C.) measured according to ISO 1133 in the range of more than 400 to 3,500 g/10 min.

Preferably the amount of the first polypropylene (PP1) and the second polypropylene (PP2) together makes up at least 80 wt.-% of the polypropylene composition (PC) and/or the amount of the first polypropylene (PP1) and the second polypropylene (PP2) together makes up at least 80 wt.-% of the melt blown fiber (MBF).

More preferably the amount of the polypropylene composition (PC) makes up at least 80 wt.-% of the melt blown fiber (MBF).

It is especially preferred that the weight ratio between the first polypropylene (PP1) and the second polypropylene (PP2) [wt.-% (PP1)/wt.-% (PP2)] is in the range of 0.02 to 0.45.

Preferably the ratio of the weight molecular weight Mw of the mixture (M) to the weight molecular weight Mw of the first polypropylene (PP1) [Mw(M)/Mw(PP1)] is in the range of 2.0 to 10.0.

The mixture (M) and/or the polypropylene composition (PC) preferably has/have a molecular weight distribution (Mw/Mn) in the range of 3.5 to 7.0.

In a preferred embodiment the first polypropylene (PP1) has a molecular weight distribution (Mw/Mn) in the range of 1.5 to 3.0.

In a specific embodiment the mixture (M) and/or the polypropylene composition (PC) has/have a comonomer content of at most 12.5 mol.-%.

Still more preferably the polypropylene composition (PC) has a xylene cold soluble (XCS) fraction in the range of 2.8 to 35.0 wt.-%.

Yet more preferably mixture (M) and/or the polypropylene composition (PC) has/have a melting temperature Tm of at least 145° C.

It is especially preferred that the weight molecular weight Mw of the second polypropylene (PP2) is higher than the weight molecular weight Mw of the first polypropylene (PP1), preferably the weight molecular weight Mw of the second polypropylene (PP2) is in the range of 60 to 120 kg/mol.

Additionally it is preferred that the second polypropylene (PP2) has a comonomer content of at most 5.5 mol.-%.

Concerning the first polypropylene ($PP_1$) it is preferred that it has a comonomer content of at most 33.5 mol.-% and/or a xylene cold soluble (XCS) fraction in the range of 50 to 95 wt.-%.

Preferably the melt blown fibers (MBF) have an average diameter of 0.5 to 5.0 μm.

In addition the present invention is directed to a melt-blown web (MBW) comprising melt blown fibers (MBF) as defined above and in more detail below.

It is especially preferred that the melt-blown web (MBW) has a weight per unit area of at most 120 g/m².

Additionally the invention is directed to an article comprising a melt-blown web (MBW) as defined above and in more detail below wherein article is selected from the group consisting of filtration medium, diaper, sanitary napkin, panty liner, incontinence product for adults, protective clothing, surgical drape, surgical gown, and surgical wear.

In the following the invention will be described in more detail.

The Melt Blown Fiber (MBF)

The melt blown fiber (MBF) according to this invention must comprise a polypropylene composition (PC) wherein said polypropylene composition (PC) comprises a first polypropylene (PP1) and a second polypropylene (PP2). The definition of the melt blown fiber (MBF) is also applicable to the sum of melt blown fibers (MBFs) which are produced with the same material comprising the polypropylene composition (PC), preferably which are produced with the same polypropylene composition (PC).

It is preferred that the main component of the melt blown fiber (MBF) is the polypropylene composition (PC). Accordingly it is preferred that the melt blown fiber (MBF) contains at least 80 wt.-%, more preferably at least 90 wt.-%, still more preferably 95 wt.-% of the polypropylene composition (PC). Thus in one preferred embodiment the melt blown fiber (MBF) consists of the polypropylene composition (PC).

Additionally it is preferred that the melt blown fiber (MBF) comprises at least 80 wt.-%, more preferably at least 85 wt.-%, yet more preferably at least 90 wt.-%, like at least 95 wt.-%, of the mixture (M), i.e. of the first polypropylene (PP1) and the second polypropylene (PP2) together, based on the total weight of the melt blown fiber (MBF).

Accordingly in one specific embodiment the melt blown fiber (MBF) consists of the polypropylene composition (PC), wherein further preferably the polypropylene composition (PC) consists of the mixture (M), i.e. the mixture of the first polypropylene (PP1) and the second polypropylene (PP2), and additives (AD), wherein more preferably the amount of the mixture (M), i.e. of the mixture of the first polypropylene (PP1) and the second polypropylene (PP2), is at least 85 wt.-%, yet more preferably at least 90 wt.-%, like at least 95 wt.-%, based on the total weight of the polypropylene composition (PC).

Preferably the melt blown fibers (MBFs) according to the present invention preferably have an average diameter (average filament fineness) measured of not more than 5.0 μm, more preferably of not more than 4.5 μm. It is in particular appreciated that the average diameter of the melt blown fibers (MBFs) is in the range of 0.3 to 5.0 μm, more preferably in the range of 0.5 to 4.5 μm, yet more preferably in the range of 0.7 to 4.0 μm.

The Mixture (M) and the Polypropylene Composition (PC)

As mentioned above the polypropylene composition (PC) comprises a first polypropylene (PP1) and a second polypropylene (PP2). It is preferred that the first polypropylene (PP1) and the second polypropylene (PP2) together make up the main part of the polypropylene composition (PC). According to this invention the mixture (M) is regarded as a mixture consisting of the first polypropylene (PP1) and the second polypropylene (PP2). Accordingly in one preferred embodiment the first polypropylene (PP1) and the second polypropylene (PP2) are the only polypropylenes, more preferably the only polymers in the polypropylene composition (PC). Therefore it is preferred that the polypropylene composition (PC) comprises at least 80 wt.-%, more preferably at least 85 wt.-%, yet more preferably at least 90 wt.-%, like at least 95 wt.-%, of the mixture (M), i.e. of the first polypropylene (PP1) and the second polypropylene (PP2) together, based on the total weight of the polypropylene composition (PC). The remaining part of the polypropylene composition (PC) is typical additives (AD). Thus in a preferred embodiment the polypropylene composition (PC) consists of the mixture (M), i.e. the mixture of the first polypropylene (PP1) and the second polypropylene (PP2), and the additives (AD), wherein more preferably the amount of the mixture (M), i.e. of the mixture of the first polypropylene (PP1) and the second polypropylene (PP2), is at least 85 wt.-%, yet more preferably at least 90 wt.-%, like at least 95 wt.-%, based on the total weight of the polypropylene composition (PC).

As mentioned above the polypropylene composition (PC) comprises the first polypropylene (PP1) and the second polypropylene (PP2). It is preferred that the weight ratio between the first polypropylene (PP1) and the second polypropylene (PP2) [wt.-% (PP1)/wt.-% (PP2)] is in the range of 0.02 to 0.45, more preferably in the range of 0.03 to 0.37, yet more preferably in the range of 0.04 to 0.37, like in the range of 0.04 to 0.34.

It is especially preferred that the mixture (M), i.e. the mixture of the first polypropylene (PP1) and the second polypropylene (PP2), has a melt flow rate $MFR_2$ (230° C.) measured according to ISO 1133 in the range of more than 400 to 3,500 g/10 min, more preferably in the range of 420 to 3000 g/10 min, still more preferably in the range of 440 to 2800 g/10 min, like in the range of 440 to 900 g/10 min.

Additionally or alternatively to the previous paragraph it is preferred that the mixture (M), i.e. the mixture of the first polypropylene (PP1) and the second polypropylene (PP2), has a weight molecular weight Mw in the range of 50 to 110 kg/mol, more preferably in the range of 55 to 105 kg/mol, like in the range of 60 to 100 kg/mol.

Further it is preferred that the mixture (M), i.e. the mixture of the first polypropylene (PP1) and the second polypropylene (PP2), has a molecular weight distribution (Mw/Mn) in the range of 4.0 to 10.0, more preferably in the range of 4.5 to 9.0, like in the range of 4.8 to 8.5.

In a preferred embodiment the information provided for the mixture (M) with regard to the melt flow rate $MFR_2$, the weight molecular weight Mw as well as to the molecular weight distribution (Mw/Mn) is also applicable for the polypropylene composition (PC). This holds in particular true in case the polypropylene composition (PC) consists of the mixture (M) and optional additives (AD). Accordingly it is preferred that the polypropylene composition (PC) has a melt flow rate $MFR_2$ (230° C.) measured according to ISO 1133 in the range of more than 400 to 3,500 g/10 min, more preferably in the range of 420 to 3000 g/10 min, like in the range of 440 to 2800 g/10 min and/or a weight molecular weight Mw in the range of 50 to 110 kg/mol, more preferably in the range of 55 to 105 kg/mol, like in the range of 60 to 100 kg/mol, and/or a molecular weight distribution (Mw/Mn) in the range of 4.0 to 10.0, more preferably in the range of 4.5 to 9.0, like in the range of 4.8 to 8.5.

It is especially preferred that the ratio of the weight molecular weight Mw of the mixture (M) to the weight molecular weight Mw of the first polypropylene (PP1) [Mw(M)/Mw(PP1)] is in the range of 2.0 to 10.0, more preferably in the range 3.0 to 8.0, yet more preferably in the range of 4.0 to 6.0.

Additionally or alternatively to the previous paragraph it is preferred that the weight molecular weight Mw of the polypropylene composition (PC) to the weight molecular weight Mw of the first polypropylene (PP1) [Mw(PC)/Mw(PP1)] is in the range of 2.0 to 10.0, more preferably in the range 3.0 to 8.0, yet more preferably in the range of 4.0 to 6.0.

Additionally it is preferred that the ratio of the weight molecular weight Mw of the second polypropylene (PP2) to the weight molecular weight Mw of the mixture (M) [Mw(PP2)/Mw(M)] is in the range of more than 1.00 to 3.00, more preferably in the range 1.01 to 2.50, yet more preferably in the range of 1.01 to 2.00 and/or the ratio of the melt flow rate $MFR_2$ of the mixture (M) to the melt flow rate $MFR_2$ of the second polypropylene [$MFR_2(M)/MFR_2(PP2)$]

is in the range of more than 1.00 to 6.00, more preferably in the range of 1.02 to 5.00, yet more preferably in the range of 1.04 to 3.00.

Additionally or alternatively to the previous paragraph it is preferred that the ratio of the weight molecular weight Mw of the second polypropylene (PP2) to the weight molecular weight Mw of the polypropylene composition (PC) [Mw(PP2)/Mw(PC)] is in the range of more than 1.00 to 3.00, more preferably in the range 1.01 to 2.50, yet more preferably in the range of 1.01 to 2.00 and/or the ratio of the melt flow rate $MFR_2$ of the polypropylene composition (PC) to the melt flow rate $MFR_2$ of the second polypropylene [$MFR_2$(PC)/$MFR_2$ (PP2)] is in the range of more than 1.00 to 6.00, more preferably in the range of 1.02 to 5.00, yet more preferably in the range of 1.04 to 3.00.

As explained in detail below the first polypropylene (PP1) and/or the second polypropylene (PP2) comprise(s) apart from propylene also comonomers. Accordingly the mixture (M) and/or the polypropylene composition (PC) comprise(s) apart from propylene ethylene and/or $C_4$ to $C_{12}$ α-olefins.

Thus the mixture (M) and/or the polypropylene composition (PC) may comprise in addition to propylene monomers such as ethylene and/or $C_4$ to $C_{12}$ α-olefins, in particular ethylene and/or $C_4$ to $C_8$ α-olefins, e.g. ethylene, 1-butene and/or 1-hexene.

Preferably the mixture (M) and/or the polypropylene composition (PC) has/have a comonomer content, like an ethylene content, of at most 12.5 mol-%, more preferably in the range of 0.4 to 12.5 mol-%, yet more preferably in the range of 0.6 to 11.5 mol-%, yet more preferably in the range of 0.7 to 10.5 mol.-%.

The mixture (M) and/or the polypropylene composition (PC) has/have preferably a rather high melting temperature Tm. Accordingly it is preferred that the mixture (M) and/or the polypropylene composition (PC) has/have a melting temperature Tm of at least 140° C., more preferably in the range of 150 to 170° C., yet more in the range of 155 to 167° C., still yet more preferably in the range of 157 to 165° C.

Additionally it is preferred that the mixture (M) and/or the polypropylene composition (PC) has/have a xylene cold soluble (XCS) content in the range of 2.8 to 35.0 wt.-%, more preferably in the range 3.5 to 32.0 wt.-%, yet more preferably in the range of 4.0 to 30.0 wt.-%, like in the range of 8.0 to 27.0 wt.-%.

The polypropylene composition (PC) (and thus also the mixture (M)) can be produced in a sequential polymerization process wherein in a first step the first polypropylene (PP1) and in a second step the second polypropylene (PP2) is produced. Alternatively in the first step the second polypropylene (PP2) may be produced and subsequently in a second step the first polypropylene (PP1). However it is especially preferred that the polypropylene composition (PC) is obtained by (melt) blending the first polypropylene (PP1) and the second polypropylene (PP2) and optional additives (AD).

The first polypropylene (PP1) and the second polypropylene (PP2) are preferably polymers known in the art. Typically the first polypropylene (PP1) is a polypropylene produced in the presence of a single-site catalyst, like the commercial products of the "Licocene" series of Clariant (Germany), Vistamaxx 8880 of ExxonMobil (USA) or L-MODU of Idemitsu (Japan). On the other hand the second polypropylene (PP2) is preferably a polypropylene produced in the presence of a Ziegler-Natta catalyst, like the commercial propylene homopolymer HL504FB of Borealis AG.

The first polypropylene (PP1) and the second polypropylene (PP2) will be now defined in more detail.

The First Polypropylene (PP1)

As mentioned above the mixture (M) comprises, preferably consists of, the first polypropylene (PP1) and the second polypropylene (PP2). In the following both polymers are described in more detail.

The first polypropylene (PP1) preferably has a comonomer content, like ethylene content, of at most 33.5 mol-%, more preferably of in the range of 7.0 to 33.5 mol-%, yet more preferably in the range of 8.5 to 29.5 mol-%, still more preferably in the range of 10.0 to 27.0 mol-%, like in the range of 12.0 to 20.0 mol-%. Accordingly the first polypropylene (PP1) can be a first propylene homopolymer (H-PP1) or a first random propylene copolymer (R-PP1), the latter being preferred.

The expression "propylene homopolymer" used in the instant invention relates to a polypropylene that consists substantially, i.e. of more than 99.70 mol-%, still more preferably of at least 99.80 mol-%, of propylene units. In a preferred embodiment only propylene units in the propylene homopolymer are detectable.

In case the first polypropylene (PP1) is a first random propylene copolymer (R-PP1) it is appreciated that the first random propylene copolymer (R-PP1) comprises monomers co-polymerizable with propylene, for example co-monomers such as ethylene and/or $C_4$ to $C_{12}$ α-olefins, in particular ethylene and/or $C_4$ to $C_8$ α-olefins, e.g. 1-butene and/or 1-hexene. Preferably the first random propylene copolymer (R-PP1) according to this invention comprises, especially consists of, monomers co-polymerizable with propylene from the group consisting of ethylene, 1-butene and 1-hexene. More specifically the first random propylene copolymer (R-PP1) of this invention comprises—apart from propylene—units derivable from ethylene and/or 1-butene. In a preferred embodiment the first random propylene copolymer (R-PP1) comprises units derivable from ethylene and propylene only, i.e. is a first propylene ethylene copolymer (PEC1).

Additionally it is appreciated that the first random propylene copolymer (R-PP1), preferably the first propylene ethylene copolymer (PEC1), has preferably a co-monomer content, like an ethylene content, in the range of 7.0 to 33.5 mol-%, yet more preferably in the range of 8.5 to 29.5 mol-%, still more preferably in the range of 10.0 to 27.0 mol-%, like in the range of 12.0 to 20.0 mol-%.

The term "random" indicates in the present invention that the co-monomers of the random propylene copolymers are randomly distributed within the propylene copolymer. The term random is understood according to IUPAC (Glossary of basic terms in polymer science; IUPAC recommendations 1996).

It is especially preferred that the first polypropylene (PP1), more preferably the first random propylene copolymer (R-PP1), like the first propylene ethylene copolymer (PEC1), has a weight molecular weight Mw of at most 45 kg/mol, more preferably in the range of 10 to 45 kg/mol, yet more preferably in the range of 12 to 40 kg/mol, still more preferably in the range of 14 to 35 kg/mol, like in the range of 14 to 22 kg/mol.

Further it is preferred that the first polypropylene (PP1), more preferably the first random propylene copolymer (R-PP1), like the first propylene ethylene copolymer (PEC1), has a molecular weight distribution (Mw/Mn) in the range of 1.5 to 3.0, more preferably in the range of 1.7 to 2.8, like in the range of 1.8 to 2.7.

In a specific embodiment, the first polypropylene (PP1), more preferably the first random propylene copolymer (R-PP1), like the first propylene ethylene copolymer (PEC1), has preferably a melting temperature Tm in the range of 50 to 100° C., yet more in the range of 60 to 95° C., still yet more preferably in the range of 65 to 90° C.

Additionally, or alternatively to the previous paragraph, the first polypropylene (PP1), more preferably the first random propylene copolymer (R-PP1), like the first propylene ethylene copolymer (PEC1), has a glass transition temperature in the range of −35 to 0° C., more preferably in the range of −30 to −5° C., yet more preferably in the range of −28 to −7° C., like in the range of −28 to −18° C.

In addition, it is preferred that the first polypropylene (PP1), more preferably the first random propylene copolymer (R-PP1), like the first propylene ethylene copolymer (PEC1), has crystallinity in the range of 8 to 40%, more preferably in the range of 9 to 35%, still more preferably in the range of 10 to 30%, like in the range of 7 to 16%.

Further it is preferred that the the first polypropylene (PP1), more preferably the first random propylene copolymer (R-PP1), like the first propylene ethylene copolymer (PEC1), has a xylene cold soluble (XCS) fraction in the range of 50 to 95 wt.-%, more preferably in the range of 60 to 92 wt.-%, like in the range of 70 to 90 wt.-%.

The Second Polypropylene (PP2)

The second polypropylene (PP2) preferably has a comonomer content, like ethylene content, of at most 5.0 mol-%, more preferably of at most 4.5 mol-%, yet more preferably of at most 3.5 mol-%. Accordingly the second polypropylene (PP2) can be a second random propylene copolymer (R-PP2) or a second propylene homopolymer (H-PP2), the latter being preferred.

In case the second polypropylene (PP2) is a second random propylene copolymer (R-PP2) it is appreciated that the second random propylene copolymer (R-PP2) comprises monomers co-polymerizable with propylene, for example co-monomers such as ethylene and/or $C_4$ to $C_{12}$ α-olefins, in particular ethylene and/or $C_4$ to $C_8$ α-olefins, e.g. 1-butene and/or 1-hexene.

Preferably the second random propylene copolymer (R-PP2) according to this invention comprises, especially consists of, monomers co-polymerizable with propylene from the group consisting of ethylene, 1-butene and 1-hexene. More specifically the second random propylene copolymer (R-PP2) of this invention comprises—apart from propylene—units derivable from ethylene and/or 1-butene. In a preferred embodiment the second random propylene copolymer (R-PP2) comprises units derivable from ethylene and propylene only, i.e. is a second propylene ethylene copolymer (PEC2).

Additionally it is appreciated that the second random propylene copolymer (R-PP2), more preferably the second random propylene copolymer (R-PP2), like the second propylene ethylene copolymer (PEC2), has preferably a co-monomer content, like an ethylene content, in the range of more than 0.30 to 5.0 mol-%, more preferably in the range of more than 0.35 to 4.5 mol-%, yet more preferably in the range of 0.40 to 3.5 mol-%.

It is especially preferred that the weight molecular weight Mw of second polypropylene (PP2), like the second propylene homopolymer (H-PP2), is higher than the weight molecular weight Mw of the first polypropylene (PP1), like the first random propylene copolymer (R-PP1), e.g. the first propylene ethylene copolymer (PEC1). Accordingly it is preferred that the weight molecular weight Mw of the second polypropylene (PP2), like the second propylene homopolymer (H-PP2), is in the range of 60 to 120 kg/mol, more preferably in the range of 65 to 110 kg/mol, like in the range of 70 to 100 kg/mol.

Additionally or alternatively to the previous paragraph it is preferred that the second polypropylene (PP2), like the second propylene homopolymer (H-PP2), has a melt flow rate $MFR_2$ (230° C.) measured according to ISO 1133 in the range of more than 300 to 3000 g/10 min, more preferably in the range of 350 to 2500 g/10 min, more preferably in the range of 400 to 2200 g/10 min, like in the range of 400 to 1000 g/10 min.

Further it is preferred that the second polypropylene (PP2), like the second propylene homopolymer (H-PP2), has a molecular weight distribution (Mw/Mn) in the range of 3.5 to 7.0, more preferably in the range of 3.8 to 6.5, like in the range of 4.0 to 6.0.

In a specific embodiment, the second polypropylene (PP2), like the second propylene homopolymer (H-PP2), has preferably a melting temperature Tm in the range of 150 to 170° C., yet more in the range of 155 to 167° C., still yet more preferably in the range of 157 to 165° C.

Additionally or alternatively to the previous paragraph, the second polypropylene (PP2), like the second propylene homopolymer (H-PP2), has a glass transition temperature in the range of −7 to 5° C., more preferably in the range of −6 to 4° C., yet more preferably in the range of −5 to 3° C.

In addition, it is preferred that the second polypropylene (PP2), like the second propylene homopolymer (H-PP2), has crystallinity in the range of 41 to 60%, more preferably in the range of 45 to 55%, still more preferably in the range of 47 to 53%.

Further it is preferred that the second polypropylene (PP2), like the second propylene homopolymer (H-PP2), has a xylene cold soluble (XCS) fraction in the range of 1.8 to 10.0 wt.-%, more preferably in the range of 2.0 to 9.0 wt.-%, like in the range of 2.2 to 8.5 wt.-%.

Additives (AD)

In addition to the mixture (M) the polypropylene composition (PC) may include additives (AD). Typical additives are nucleating agents acid scavengers, antioxidants, colorants, light stabilisers, plasticizers, slip agents, anti-scratch agents, dispersing agents, processing aids, lubricants, pigments, and the like.

Such additives are commercially available and for example described in "Plastic Additives Handbook", $6^{th}$ edition 2009 of Hans Zweifel (pages 1141 to 1190).

Furthermore, the term "additives (AD)" according to the present invention also includes carrier materials, in particular polymeric carrier materials (PCM).

The Polymeric Carrier Material (PCM)

Preferably the polypropylene composition (PC) of the invention does not comprise (a) further polymer (s) different to the mixture (M), i.e. different to the first polypropylene (PP1) and the second polypropylene (PP2), in an amount exceeding 10 wt.-%, preferably in an amount exceeding 5 wt.-%, more preferably in an amount exceeding 3 wt.-%, based on the weight of the polypropylene composition (PC). If an additional polymer is present, such a polymer is typically a polymeric carrier material (PCM) for additives (AD). Any carrier material for additives (AD) is not calculated to the amount of polymeric compounds as indicated in the present invention, but to the amount of the respective additive.

The polymeric carrier material (PCM) is a carrier polymer for the other additives (AD) to ensure a uniform distribution in the composition of the invention. The polymeric carrier material (PCM) is not limited to a particular polymer. The polymeric carrier material (PCM) may be ethylene homopolymer, ethylene copolymer obtained from ethylene and α-olefin comonomer such as $C_3$ to $C_8$ α-olefin comonomer, propylene homopolymer and/or propylene copolymer obtained from propylene and α-olefin comonomer such as ethylene and/or $C_4$ to $C_8$ α-olefin comonomer.

The Melt Blown Web (MBW)

The present invention is not only directed to the melt blown fibers (MBFs) as such but also to articles, like webs, made thereof.

In particular the present invention is directed to a melt blown web (MBW) comprising melt blown fibers (MBFs) of the instant invention. More preferably the melt blown web (MBW) comprises, based on the total weight of the melt blown web (MBW), at least 80 wt.-%, more preferably at least 90 wt.-%, yet more preferably at least 95 wt.-%, like at least 99 wt.-%, of melt blown fibers (MBFs) as defined herein. In one specific embodiment the melt blown web (MBW) consists of the melt blown fibers (MBFs) as defined herein.

Further the present invention is directed to articles comprising the melt blown fibers (MBFs) and/or the melt-blown web (MBW) of the present invention, like filtration medium (filter), diaper, sanitary napkin, panty liner, incontinence product for adults, protective clothing, surgical drape, surgical gown, and surgical wear, comprising the melt-blown fibers (MBFs) and/or the melt-blown web (MBW), preferably in an amount of at least 80.0 wt.-% of, more preferably in an amount of at least 95.0 wt.-%, based on the total weight of the article. In one embodiment of the present invention, the article consists of the melt-blown fibers (MBFs) and/or the melt-blown web (MBW).

In one embodiment the invention is directed to articles selected from the group consisting of filtration medium (filter), diaper, sanitary napkin, panty liner, incontinence product for adults, protective clothing, surgical drape, surgical gown, and surgical wear, comprising a melt blown web (MBW) comprising, e.g. consisting of, the melt blown fibers (MBFs) of the present invention and a spunbonded fabric known in the art.

The weight per unit area of the melt-blown web (MBW) depends very much on the end use, however it is preferred that the melt-blown web has a weight per unit area of at least 1 g/m², more preferably in the range from 1 to 250 g/m², still more preferably in the range from 3 to 220 g/m², yet more preferably in the range from 6 to 200 g/m², like in the range from 6 to 100 g/m². These values are especially applicable in case the melt-blown web (MBW) according to the instant invention is produced as a single layer web (e.g. for air filtration purposes).

In case the melt-blown web (MBW) according to the instant invention is produced as one part of a multi-layer construction like an SMS-web comprising, preferably consisting of, a spunbonded web layer, a melt-blown web (MBW) layer and another spunbonded web layer (e.g. for hygienic application), the melt-blown web (MBW) has a weight per unit area of at least 1 g/m², more preferably in the range of 1 to 30 g/m², still more preferably in the range of 1.3 to 20 g/m². Alternatively, the multi-layer construction can also include a multiplicity of melt-blown web layers and spunbonded web layers, such as a SSMMS construction.

The instant polypropylene composition (PC) is preferably used in pellet or granule form for the preparation of the melt-blown fibers (MBFs) (and thus of the melt-blown web (MBW)).

In the process metering pumps are used to pump the molten t polypropylene composition (PC) to a distribution system having a series of die tips, the polypropylene composition (PC) being in the molten state at some processing temperature. The die tip is designed in such a way that the holes are in a straight line with high-velocity air impinging from each side. A typical die will have 0.3 to 0.5 mm diameter, preferably 0.4 mm diameter, holes spaced at 10 to 16 per cm (25 to 40 per inch). The impinging high-velocity hot air attenuates the filaments and forms the desired fibers Immediately below or adjacent to the die, a large amount of ambient air is drawn into the hot air stream containing the fibers which cools the hot gas and solidifies the fibers onto a forming belt or other solid surface that is typically moving in such a manner as to create a continually renewed surface for the fibers to contact and form a web. The processing temperature is one factor in the final web properties. The "optimal" processing temperature is one at which ideal properties of the web are achieved such as low shot with good hand and high barrier properties, or good filtration properties.

The properties of the melt-blown fibers (MBFs) and/or the melt blown web (MBW) can be further improved in case the cooling of the fibers is not accomplished with ambient air but by water cooling.

In the following the present invention is further illustrated by means of examples.

EXAMPLES

1. Definitions/Measuring Methods

The following definitions of terms and determination methods apply for the above general description of the invention as well as to the below examples unless otherwise defined.

Quantification of Microstructure by NMR Spectroscopy

Quantitative nuclear-magnetic resonance (NMR) spectroscopy was used to quantify the comonomer content of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probe-head at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$E=0.5(S\beta\beta+S\beta\gamma+S\beta\delta+0.5(S\alpha\beta+S\alpha\gamma))$

Through the use of this set of sites the corresponding integral equation becomes:

$E=0.5(I_H+I_G+0.5(I_C+I_D))$ using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$E[\text{mol \%}]=100*fE$

The weight percent comonomer incorporation was calculated from the mole fraction:

$E[\text{wt \%}]=100*(fE*28.06)/((fE*28.06)+((1-fE)*42.08))$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

$MFR_2$ (230° C.) is measured according to ISO 1133 (230° C., 2.16 kg load).

Number Average Molecular Weight ($M_n$), Weight Average Molecular Weight ($M_w$) and Molecular Weight Distribution (MWD)

Molecular weight averages (Mw, Mn), and the molecular weight distribution (MWD), i.e. the Mw/Mn (wherein Mn is the number average molecular weight and Mw is the weight average molecular weight), were determined by Gel Permeation Chromatography (GPC) according to ISO 16014-4: 2003 and ASTM D 6474-99. A PolymerChar GPC instrument, equipped with infrared (IR) detector was used with 3×Olexis and 1×Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min 200 μL of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking in the autosampler of the GPC instrument.

Xylene cold soluble fraction (XCS wt.-%): Content of xylene cold solubles (XCS) is determined at 25° C. according ISO 16152; first edition; 2005-07-01.

DSC analysis, melting temperature ($T_m$) and heat of fusion ($H_f$), crystallization temperature ($T_c$) and heat of crystallization ($H_c$): measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_c$) and crystallization enthalpy ($H_c$) are determined from the cooling step, while melting temperature ($T_m$) and melting enthalpy ($H_m$) are determined from the second heating step. The crystallinity is calculated from the melting enthalpy by assuming an Hm-value of 209 J/g for a fully crystalline polypropylene (see Brandrup, J., Immergut, E. H., Eds. Polymer Handbook, 3rd ed. Wiley, New York, 1989; Chapter 3).

The glass transition temperature Tg is determined by dynamic mechanical analysis according to ISO 6721-7. The measurements are done in torsion mode on compression moulded samples (40×10×1 mm$^3$) between −100° C. and +150° C. with a heating rate of 2° C./min and a frequency of 1 Hz.

Grammage of the Web

The unit weight (grammage) of the webs in g/m$^2$ was determined in accordance with EN 29073-1 (1992) "Test methods for nonwovens—Determination of mass per unit area"

Average Fibre Diameter in the Web

The number average fibre diameter was determined using scanning electron microscopy (SEM). A representative part of the web was selected and an SEM micrograph of suitable magnification was recorded, then the diameter of 20 fibres was measured and the number average calculated.

Air Permeability

The air permeability was determined in accordance with DIN ISO 9237.

Hydrohead

The hydrohead or water resistance as determined by a hydrostatic pressure test is determined according to the WSP (wordwide strategic partners) standard test WSP 80.6 (09) as published in December 2009. This industry standard is in turn based on ISO 811:1981 and uses specimens of 100 cm$^2$ at 23° C. with purified water as test liquid and a rate of increase of the water pressure of 10 cm/min.

Examples

The two components PP1 and PP2 were melt-mixed in weight ratios as indicated in table 1 below in a Thermo PRISM TSE 24 twin-screw extruder at 200-240° C., followed by solidification of the resulting melt strands in a water bath and pelletization. The resulting compositions IE1 and 1E3 as well as the pure PP1 as CE1 were subsequently converted into melt-blown webs on a Reicofil MB250 line using a spinneret having 470 holes of 0.4 mm exit diameter and 35 holes per inch. Webs were produced at constant DCD (die to collector distance) of 200 mm, different melt temperatures as indicated in table 1 with a throughput of 10 kg/h.m and an air volume adapted in order to get a constant area weight of the resulting web. The resulting properties of the melt-blown webs are also indicated in table 1.

TABLE 1

Properties of PP1, PP2, polypropylene composition (PC), melt blown fibers (MBFa) and melt blown web (MBW)

|  |  | CE1 | CE2 | IE1 | IE2 | IE3 |
|---|---|---|---|---|---|---|
| PP1 | [wt.-%] | 0 | 100 | 5 | 13 | 22 |
| PP2 | [wt.-%] | 100 | 0 | 95 | 87 | 78 |
| MFR | [g/10 min] | 450 | — | 433 | 575 | 717 |
| XCS | [wt.-%] | 6.9 | 81 | 10.4 | 16.8 | 24.6 |
| C2 | [mol-%] | 0 | 11 | 0.55 | 1.43 | 2.42 |
| Mw | [kg/mol] | 92 | 17 | 90 | 86 | 82 |
| MWD | [—] | 5.0 | 2.1 | 5.1 | 5.7 | 6.2 |
| Tm | [° C.] | 161 | 81 | 164 | 163 | 163 |
| Tg | [° C.] | −0.5 | −27 | −1.0 | −1.2 | −1.6 |
| Xc | [%] | 49 | 12 | 46 | 43 | 40 |
| at melt temperatur 270° C. |  |  |  |  |  |  |
| Fiber diameter | [μm] | 1.3 | — | 0.9 | n.d. | 1.0 |
| Web weight | [g/m²] | 9.4 | — | 9.5 | n.d. | 9.5 |
| Air permeability | [mm/s] | 1364 | — | 1071 | n.d. | 1213 |
| Hydrohead (1st drop) | [cm H₂O] | 45.2 | — | 53.8 | n.d. | 54.8 |
| at melt temperatur 290° C. |  |  |  |  |  |  |
| Fiber diameter | [μm] | 1.2 | — | 0.8 | n.d. | 0.9 |
| Web weight | [g/m²] | 9.5 | — | 9.5 | n.d. | 9.5 |
| Air permeability | [mm/s] | 1065 | — | 829 | n.d. | 827 |
| Hydrohead (1st drop) | [cm H₂O] | 77.1 | — | 82.2 | n.d. | 81.8 |
| at melt temperatur 300° C. |  |  |  |  |  |  |
| Fiber diameter | [μm] | 1.1 | — | 0.8 | n.d. | 0.8* |
| Web weight | [g/m²] | 9.5 | — | 9.5 | n.d. | 9.5* |
| Air permeability | [mm/s] | 638 | — | 715 | n.d. | 383* |
| Hydrohead (1st drop) | [cm H₂O] | 12.7 | — | 105.6 | n.d. | 134* |

*at melt temperature 310° C.
PP1 is the the commercial propylene ethylene copolymer "Licocene PP1302" of Clariant
PP2 is the the commercial propylene homopolymer "HL504FB" of Borealis AG

What is claimed is:

1. A melt blown fiber consisting of a polypropylene composition comprising at least 95 wt %, based on the total weight of the polypropylene composition, of a mixture consisting of:
   (a) a first polypropylene having a weight molecular weight Mw in the range of 14 to 22 kg/mol, wherein the first polypropylene is a random propylene ethylene copolymer; and
   (b) a second polypropylene having a weight molecular weight Mw in the range of 70 to 100 kg/mol and a molecular weight distribution (Mw/Mn) in the range of 3.5 to 7.0, wherein the second polypropylene is a propylene homopolymer,
   wherein the mixture consisting of the first polypropylene and the second polypropylene has a melt flow rate MFR$_2$ (230° C.) measured according to ISO 1133 in the range of more than 400 to 900 g/10min,
   wherein the mixture consisting of the first polypropylene and the second polypropylene has an ethylene content in the range of 0.4 to 12.5 mol-%.

2. The melt blown fiber according to claim 1, wherein the mixture has a weight molecular weight Mw in the range of 50 to 110 kg/mol.

3. The melt blown fiber according to claim 1, wherein the polypropylene composition has:
a weight molecular weight Mw in the range of 50 to 110 kg/mol.

4. The melt blown fiber according to claim 1, wherein the weight ratio between the first polypropylene and the second polypropylene is in the range of 0.02 to 0.45.

5. The melt blown fiber according to claim 1, wherein the ratio of the weight molecular weight Mw of the mixture to the weight molecular weight Mw of the first polypropylene is in the range of 2.0 to 10.0.

6. The melt blown fiber according to claim 1, wherein:
the first polypropylene has a molecular weight distribution (Mw/Mn) in the range of 1.5 to 3.0.

7. The melt blown fiber according to claim 1, wherein the mixture consisting of the first polypropylene and the second polypropylene has:
a melting temperature Tm of at least 145° C.

8. The melt blown fiber according to claim 1, wherein the polypropylene composition has a xylene cold soluble fraction in the range of 2.8 to 35.0 wt.-%.

9. The melt blown fiber according to claim 1, wherein the second polypropylene has a comonomer content of at most 5.5 mol-%.

10. The melt blown fiber according to claim 1, wherein the first polypropylene has:
   (a) a comonomer content of at most 33.5 mol-%; and/or
   (b) a xylene cold soluble fraction in the range of 50 to 95 wt.-%.

11. The melt blown fiber according to claim 1, wherein the fibers have an average diameter of 0.5 to 5.0 μm.

12. A melt-blown web comprising melt blow fibers each consisting of a polypropylene compositing comprising at least 95 wt %, based on the total weight of the polypropylene composition, of a mixture consisting of:

(a) a first polypropylene having a weight molecular weight Mw in the range of 14 to 22 kg/mol, wherein the first polypropylene is a random propylene ethylene copolymer; and (b) a second polypropylene having a weight molecular weight Mw in the range of 70 to 100 kg/mol and having a molecular weight distribution (Mw/Mn) in the range of 3.5 to 7.0, wherein the second polypropylene is a propylene homopolymer;

wherein the mixture consisting of the first polypropylene and the second polypropylene has a melt flow rate $MFR_2$ (230° C.) measured according to ISO 1133 in the range of more than 400 to 900 g/10min, wherein the mixture consisting of the first polypropylene and the second polypropylene has an ethylene content in the range of 0.4 to 12.5 mol-%.

13. The melt-blown web according to claim 12 having a weight per unit area of at most 120 g/m².

14. An article comprising a melt-blown web, the melt-blown web comprising melt blown fibers each consisting of a polypropylene composition comprising at least 95 wt. %, based on the total weight of the polypropylene composition, of a mixture consisting of:

(a) a first polypropylene having a weight molecular weight Mw in the range of 14 to 22 kg/mol, wherein the first polypropylene is a random propylene ethylene copolymer; and (b) a second polypropylene having a weight molecular weight Mw in the range of 70 to 100 kg/mol and having a molecular weight distribution (Mw/Mn) in the range of 3.5 to 7.0, wherein the second polypropylene is a propylene homopolymer;

wherein the mixture consisting of the first polypropylene and the second polypropylene has a melt flow rate $MFR_2$ (230° C.) measured according to ISO 1133 in the range of more than 400 to 900 g/10min, wherein the mixture consisting of the first polypropylene and the second polypropylene has an ethylene content in the range of 0.4 to 12.5 mol-%.

15. The article of claim 14, wherein the article is selected from the group consisting of: filtration medium, diaper, sanitary napkin, panty liner, incontinence product for adults, protective clothing, surgical drape, surgical gown, and surgical wear.

16. The melt blown fiber according to claim 1, wherein the mixture consisting of the first polypropylene and the second polypropylene has a melt flow rate $MFR_2$ (230° C.) measured according to ISO 1133 in the range of more than 440 to 900 g/10 min.

* * * * *